(12) United States Patent
Delville

(10) Patent No.: US 8,544,738 B2
(45) Date of Patent: Oct. 1, 2013

(54) ONBOARD COMPUTER TICKETING TERMINAL

(75) Inventor: Florence Delville, Evry (FR)

(73) Assignee: Thales, Neuilly sur Seine (FR)

( * ) Notice: Subject to any disclaimer, the term of this patent is extended or adjusted under 35 U.S.C. 154(b) by 737 days.

(21) Appl. No.: 12/664,443

(22) PCT Filed: May 29, 2008

(86) PCT No.: PCT/EP2008/056641
§ 371 (c)(1),
(2), (4) Date: Mar. 10, 2010

(87) PCT Pub. No.: WO2009/000607
PCT Pub. Date: Dec. 31, 2008

(65) Prior Publication Data
US 2010/0176198 A1  Jul. 15, 2010

(30) Foreign Application Priority Data
Jun. 22, 2007  (FR) ...................................... 07 04505

(51) Int. Cl.
*G07B 15/02* (2011.01)
(52) U.S. Cl.
USPC .......................................................... 235/384
(58) Field of Classification Search
USPC .......................................................... 235/384
See application file for complete search history.

(56) References Cited

U.S. PATENT DOCUMENTS

| 4,977,502 A | 12/1990 | Baker et al. |
| 2005/0087424 A1* | 4/2005 | Newsome et al. ............. 194/320 |
| 2005/0156024 A1 | 7/2005 | Ichikawa et al. |
| 2006/0038009 A1* | 2/2006 | Russell et al. ................ 235/383 |
| 2008/0182639 A1* | 7/2008 | Antonopoulos et al. ........ 463/17 |
| 2008/0212215 A1* | 9/2008 | Schofield et al. ............. 359/844 |

FOREIGN PATENT DOCUMENTS

| DE | 10356688 A1 | 6/2005 |
| WO | 0070538 A1 | 11/2000 |
| WO | 0138098 A2 | 5/2001 |
| WO | 2004102494 A1 | 11/2004 |

* cited by examiner

*Primary Examiner* — Michael G Lee
*Assistant Examiner* — David Tardif
(74) *Attorney, Agent, or Firm* — Stroock & Stroock & Lavan LLP

(57) ABSTRACT

The present invention relates to an onboard ticketing terminal notably aboard a public transport vehicle. The ticketing terminal (30) comprises a body (39) equipped with at least a card reader, a swiveling customer interface (36, 37), a printer, incorporated into said body (39), paper output (40) from the printer being performed through a swiveling slot made in the body (39), and a swiveling driver interface. The ticketing terminal (30) makes it possible notably to implement transport ticket sales applications by virtue of an interface with an onboard central unit (21).

13 Claims, 4 Drawing Sheets

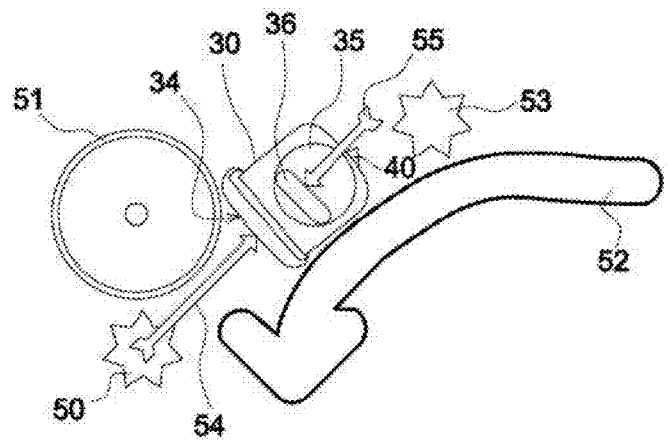
FIG.5a
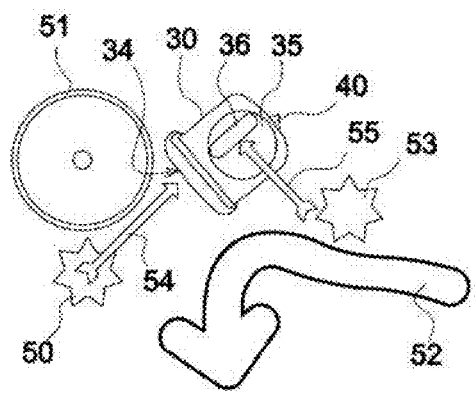 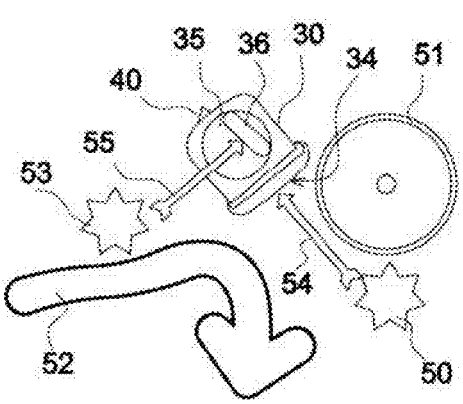
FIG.5b                    FIG.5c

ONBOARD COMPUTER TICKETING TERMINAL

CROSS REFERENCE TO RELATED APPLICATIONS

The present application is the U.S. National Phase of International Patent Application Serial No. PCT/EP2008/056641, filed May 29, 2008, which claims the benefit of French Patent Application Serial No. 0704505, filed Jun. 22, 2007, both of which are hereby incorporated by reference in their entireties.

BACKGROUND OF THE INVENTION

The present invention relates to an onboard ticketing terminal notably aboard a public transport vehicle. The ticketing terminal makes it possible notably to implement transport ticket sales applications.

BRIEF DESCRIPTION OF THE PRIOR ART

Ticketing systems encompass an assembly of equipment intended to process transport tickets associated with provision and execution of people transport services.

The usual ticketing systems include notably transport ticket sales and validation systems. These transport ticket sales and validation systems can be automated sales facilities, sales software, transport ticket validation apparatus, portable equipment carried by inspectors, subway gateways.

Public transport vehicles such as buses or trams generally use an onboard terminal comprising a central unit, a display and a sales unit which can be optional.

An onboard terminal aboard a public transport vehicle must meet performance requirements notably in terms of processor and memory, integrated into the terminal.

Moreover, constraints related to installation in a mobile environment are heavy. Indeed, the terminal is subject to knocks, vibrations as well as to an extensive range of temperatures. Electronic sub-systems of the terminal are therefore notably adapted to these constraints. The electronic sub-systems can be for example printers, displays, electronic cards.

Moreover, installation constraints exist which are specific to each transport operator and to each model of transport vehicle.

Currently, two main types of onboard terminals are found: an integrated terminal and a terminal possessing a distributed architecture.

A first type of onboard terminal is an integrated terminal comprising in one and the same housing: a central unit, a viewing screen for a driver and a sales unit.

The first type of terminal is a not very modular piece of equipment allowing few hardware upgrades. Indeed, since all the electronic cards are integrated into the equipment, it is hardly conceivable to upgrade the hardware resources.

The first type of terminal is in general fitted on a dashboard of a transport vehicle or alongside the dashboard. Now, the space available at the driver's cab level is very restricted. The fitting of this type of terminal is made particularly difficult because of its significant bulk.

Moreover, the first type of terminal poses a problem of ergonomics of use due to the poor positioning of the screen with respect to the driver or passenger. Indeed, the first type of terminal cannot be adapted to various installations according to the various models of transport vehicles.

A second type of terminal is a terminal possessing a distributed architecture comprising a central unit on the one hand and on the other hand, a driver screen remotely offset with respect to the central unit.

The central unit can be fitted aboard transport vehicles in technical cabinets for example under the dashboard or in voussoirs. The screen alone may be fitted on the dashboard, thus simplifying the procedures for fitting the terminal.

This type of terminal possesses very good ergonomics, since the screen is easy to fit and takes up little space in the driver's cab. It can thus be placed in an ergonomic manner with respect to the positioning of the driver and passengers.

However, this architecture has inferior functionalities and notably does not comprise any sales module.

SUMMARY OF THE INVENTION

An aim of the invention is notably to alleviate the aforesaid drawbacks. For this purpose, the subject of the invention is an onboard ticketing terminal notably aboard a transport vehicle. The ticketing terminal comprises a body equipped with at least:
a for example contactless card reader;
a swiveling customer interface;
a printer;
a swiveling driver interface.

The printer is for example incorporated into the body of the ticketing terminal. Paper output from the printer can be performed through a swiveling slot made in the body of the ticketing terminal.

The ticketing terminal can be linked by one or more interfaces to a central processing unit, remote from the ticketing terminal.

A contactless card reading location and an antenna for detecting the presence of a contactless card on the reading location, for example linked to the contactless card reader, are notably situated on a substantially horizontal upper face of the ticketing terminal.

The customer interface can comprise a swiveling screen, situated for example on a substantially horizontal upper face of the ticketing terminal.

The driver interface can comprise a swiveling screen, physically tied to the ticketing terminal.

The driver interface can comprise a touch panel.

The orientation of the customer interface can be performed by a first rotation of the customer interface about a first substantially vertical axis.

The orientation of the paper output of the printer can be achieved by a second rotation of the printer in relation to a second substantially vertical axis.

The orientation of the driver interface can be performed by a third rotation in relation to a third substantially horizontal axis.

The driver interface can pivot about the third axis passing through the upper part of the driver interface.

The first rotation and the second rotation can be locked.

The locking of the first rotation and the locking of the second rotation can be carried out by means of removable screws.

The invention has notably the main advantage of allowing a reduction in the cost of producing and fitting a ticketing terminal aboard a vehicle. The ticketing terminal according to the invention also possesses good ergonomics of use whatever the type of vehicle in which it is installed. The fitting of the ticketing terminal according to the invention is advantageously simplified.

BRIEF DESCRIPTION OF THE DRAWINGS

Other characteristics and advantages of the invention will become apparent with the aid of the description which follows, given by way of nonlimiting illustration and in conjunction with the appended drawings which represent:

FIG. 5a: a principle of positioning of the various elements of the terminal and of positioning of the terminal according to the invention itself;

FIG. 5b: an exemplary adaptation of the terminal according to the invention to a left-hand side driver's cab;

FIG. 5c: an exemplary adaptation of the terminal according to the invention to a right-hand side driver's cab;

DETAILED DESCRIPTION

Figure 1:
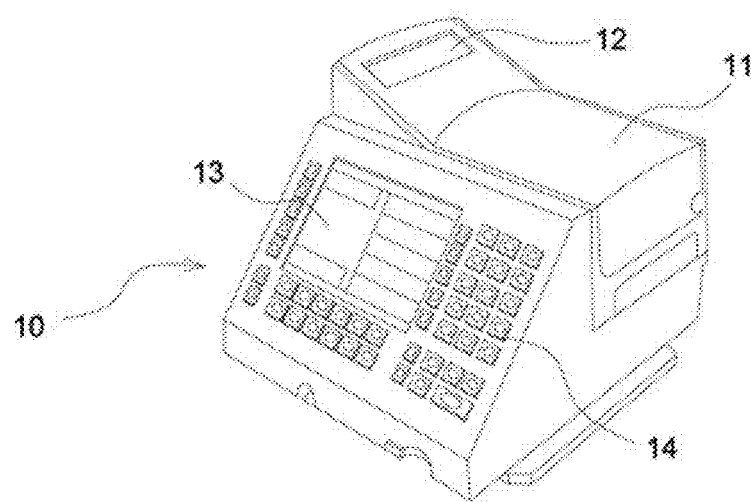
FIG. 1: an exemplary integrated terminal according to the prior art.

FIG. 1 represents an exemplary integrated ticketing terminal 10 according to the prior art. The integrated ticketing terminal 10 may be on board a public transport vehicle for example. The integrated ticketing terminal 10 comprises in one and the same housing a first central unit, not represented in FIG. 1. The first central unit comprises for example a first processor card, interface cards and memory cards. The first central unit is notably charged with processing various data related to various ticketing functions. The integrated terminal 10 comprises a first contactless card reader 11 as well as a first customer interface 12 exhibited in the form of a first display screen. The first contactless card reader 11 can allow the first central unit to verify the validity of a contactless transport ticket or to perform a sale of a product, on the contactless transport ticket presented on the contactless card reader 11. The first customer interface 12 can allow a customer to verify information stored on his transport ticket. A second display screen 13 is an interface between a driver and the integrated ticketing terminal 10. A keypad 14 allows the driver to enter various parameters.

The main drawbacks of this integrated ticketing terminal 10 according to the prior art are of affording poor ergonomics with respect to the driver as well as to the passengers, and of having a significant bulk giving rise to difficulties of positioning during fitting aboard the public transport vehicle. Moreover, the integrated ticketing terminal 10 is not easily adaptable to various types of public transport vehicles. The integrated ticketing terminal 10 also possesses few capabilities in terms of hardware upgrade.

Figure 2:
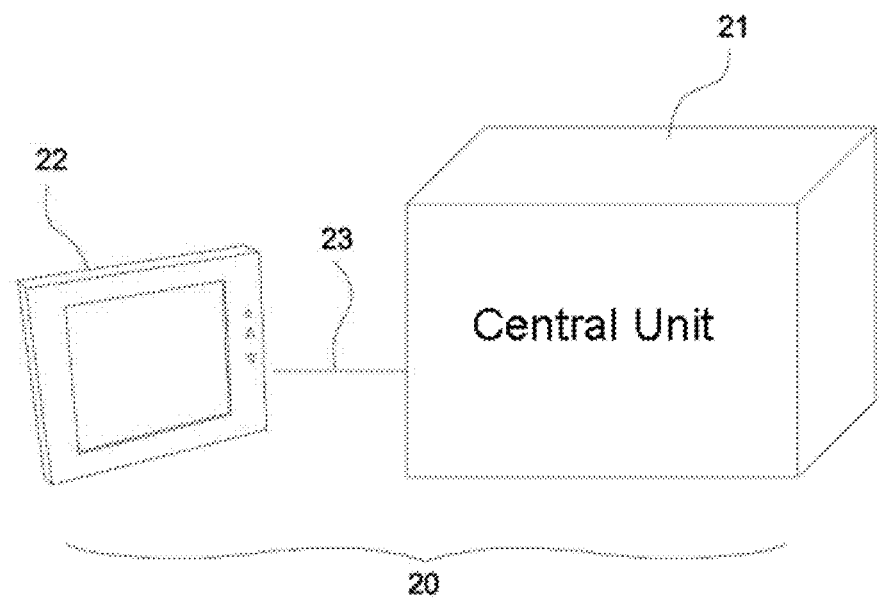
FIG. 2: an exemplary distributed architecture of a terminal according to the prior art.

FIG. 2 represents an exemplary distributed architecture of a terminal 20 according to the prior art. The terminal 20 comprises notably a second central unit 21, and a screen 22 remotely offset with respect to the central unit 21. The terminal 20 comprises a first wired link 23 for transmitting a video signal between the second central unit 21 and the screen 22. A terminal of the type of the terminal 20 has functions limited to display and entry functions. The screen 22 integrates for example a touch panel. A terminal of the type of the terminal 20 may not therefore be used by public transport vehicles needing a transport ticket sales function. Indeed, the terminal 20 does not comprise any contactless card reader for example, or printer.

Figure 3:
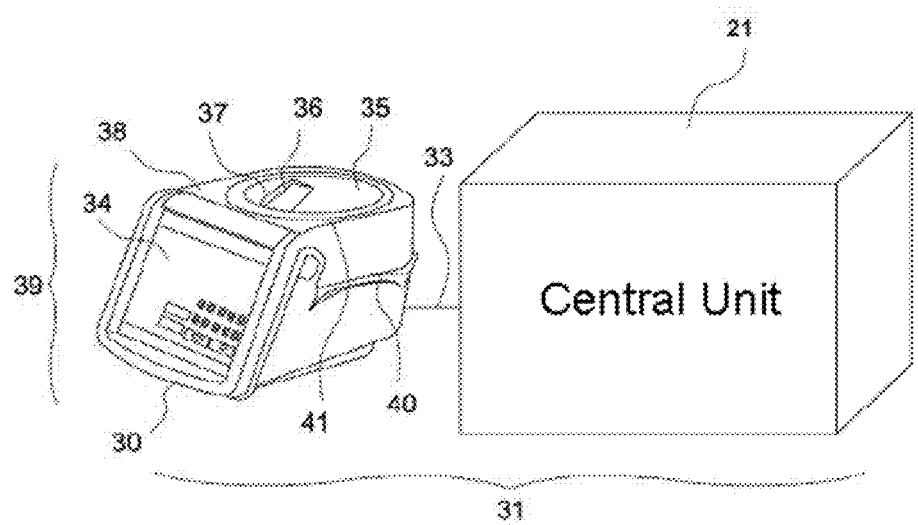
FIG. 3: an exemplary embodiment of a terminal according to the invention.

FIG. 3 represents an exemplary embodiment of a ticketing terminal 30 according to the invention. The ticketing terminal 30 forms part of a distributed architecture 31 comprising:
- the ticketing terminal 30;
- the second central unit 21 comprising notably a second processor card, interface cards, memory cards containing ticketing software;
- a link 33 between the ticketing terminal 30 and the second central unit 21.

The ticketing terminal 30 can comprise notably:
- a sales unit,
- a third processor card not represented in FIG. 3;
- a driver interface 34 destined for the driver of the transport vehicle, The sales unit can comprise notably:
- a second contactless card reader, not represented in FIG. 3, and its antenna 41;
- a location 35 for reading a contactless card;
- a customer display 36;
- a printer, not represented in FIG. 3;
- LEDs 37, the acronym standing for the expression Light Emitting Diode;
- a warning sounder, not represented in FIG. 3;

The link 33 can be a second wired link embodying for example a single interface of Ethernet type between the ticketing terminal 30 and the second central unit 21. The link 33 can be a bidirectional link allowing the passage of all the information intended for an assembly of electronic sub-systems of the ticketing terminal 30. The electronic sub-systems are for example the driver interface 34, the customer display 36, the printer, the LEDs 37, the warning sounder, the second contactless card reader. The Ethernet link 33 allows notably a distance between the ticketing terminal 30 and the second central unit 21 of the order of a hundred meters. This distance makes it possible to position the second central unit 21 at a spot in the transport vehicle remote from the driver's cab, thus releasing a significant useful place at the level of the driver's cab. A single interface between the ticketing terminal 30 and the second central unit 21 also makes it possible to installation reduce costs related to the wiring of the assembly.

In other embodiments of the invention, the link 33 can be:
- composed of several wired links;
- a wireless link such as a radio link, of WIFI type for example.

Various wired links can be used:
- an LVDS link, the acronym standing for the expression Low Voltage Differential Signaling, that may be used for the link 33 with the driver interface 34;
- a serial link can also be used for the link 33 with the third processor card of the ticketing terminal 30.

The second contactless card reader can be situated inside a body 39 of the ticketing terminal 30. The second contactless card reader makes it possible to read information of a contactless transport ticket. The second contactless card reader can also be used so as to write information to a contactless transport ticket. The second contactless card reader can perform a recharging of an electronic transport purse with a prepaid amount. The second contactless card reader can also perform a modification of the duration of validity after a payment by a transport ticket bearer for example.

The location 35 for the reading of a contactless card, in one embodiment of the ticketing terminal 30, can be situated on an upper face 38 of the body 39 of the ticketing terminal 30. In a preferred embodiment the upper face 38 is horizontal.

The antenna 41 of the second contactless card reader can surround for example the location 35 so that a contactless card placed on the location 35 can be detected by the contactless card reader through the antenna 41.

The customer display 36 can take the form of a graphical display. The customer display 36 is situated for example above the location 35 for the reading of a contactless card, on the upper face 38 of the body 39 of the ticketing terminal 30. The customer display 36 can make it possible to disseminate information to the customer such as the duration of validity of the transport ticket, a sum remaining in the electronic transport purse, the validity or invalidity of the transport ticket, a sum to be paid.

One or more LEDs 37 can make it possible to impart information to the bearer of a contactless transport ticket about the validity of the transport ticket if the transport ticket has been previously presented in front of the location 35 for the reading of a contactless card. For example a red LED 37 lit up can signify that the transport ticket presented is not valid. A green LED 37 lit up can signify that the transport ticket presented is valid. And a yellow LED 37 lit up can signify that the transport ticket presented is not readable for example. The LED or LEDs 37 therefore supplement the information imparted by the customer display 36.

The warning sounder can emit a first sound when the transport ticket presented is not valid, a second sound when the transport ticket presented is valid, a third sound when the transport ticket presented is unreadable, for example.

The warning sounder, the LED or LEDs 37, the customer display 36, the contactless card reading location 35 form notably part of a second customer interface making it possible to impart information in this way to a customer bearing a transport ticket for example.

The printer can be situated for example inside the body 39 of the ticketing terminal 30. A paper output 40 can be achieved through a side of the body 39 of the ticketing terminal 30. The paper output 40 can for example be performed through a horizontal slot made in the body 39 of the ticketing terminal 30. The printer can make it possible to print a paper ticket or a receipt for a transaction performed on the basis of the ticketing terminal 30.

The driver interface 34 allows the driver to enter data such as a credit to be added to the electronic transport purse. The driver interface 34 also allows the driver certain information such as the price of a trip for example. In order to carry out display and information entry functions at one and the same time, the driver interface 34 can comprise a screen associated for example with a touch panel.

The third processing card (not represented in FIG. 3) of the ticketing terminal 30 makes it possible notably to manage various interfaces between the various peripherals of the ticketing terminal 30 such as the driver interface 34, the printer, the warning sounder, the contactless card reader, the LEDs 37, the customer display 36, the antenna 41 for example.

The antenna 41 allows the ticketing terminal 30 to detect the contactless cards. It is linked directly to the second contactless card reader.

The ticketing terminal 30 can for example make it possible to fulfill one or more of the functions detailed hereinafter.

The ticketing terminal 30 allows management of the duty shift of the driver of the vehicle. For example, when a driver starts his duty shift, the driver can present an agent card to the second contactless card reader in order to identify himself. The driver can also enter a password by means of the driver interface 34. This identification allows the central system for example to manage the assignments of the drivers to the various vehicles as well as their work schedules. A driver can for example enter an identifier of a journey that he will make. The ticketing terminal 30 can therefore serve to perform management of routes of the transport vehicle. The route management can use locating means, for example a satellite location system or GPS, signifying Global Positioning System, to locate the vehicle with respect to a predetermined route. The driver interface 34 can allow for example the driver to signal that he is jumping a stop of the predetermined route.

The second central unit 21 can be the same central unit as that represented in FIG. 2.

The second central unit 21 can make it possible to concentrate data originating from transport ticket validation devices installed in the transport vehicle. The concentrated data can thereafter be dispatched to the central system by way of a WIFI module integrated into the second central unit 21 for example. The validation information can serve for distributing funds, arising from user payments, between several transport operators.

The second central unit 21 can also allow management of the transport tickets and notably of their validity. The transport tickets can be disallowed by the central system in case of theft for example.

The second central unit 21 can therefore be used so as to transmit and receive data originating from a central system situated in a public transport vehicle depot for example. The data received can be for example software updates or updates of tariffs range for purchasing transport tickets. The data transmitted may for example be counters for operations carried out on the ticketing terminal 30. The counters are notably used by the central system in order to perform statistical studies for example.

The ticketing terminal 30 can also be used in order to manage alarms originating from various equipment aboard the vehicle. This allows the driver to detect any-faults with this equipment. The transport ticket validation devices can for example communicate an operating state to the ticketing terminal 30.

Thereafter the ticketing terminal 30 can be used for managing the sale and validation of a contactless transport ticket for example as well as for issuing paper tickets or receipts by way of the printer.

Figure 4:
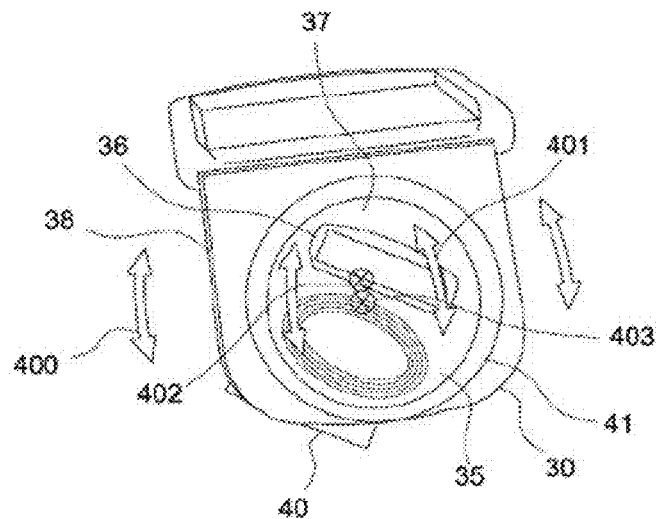
FIG. 4: various possible rotations of the elements of the terminal according to the invention.

FIG. 4 represents various possible rotations 400, 401 of elements of the ticketing terminal 30 according to the invention. The ticketing terminal 30 is represented in a view from above in FIG. 4. This view from above makes it possible to represent various elements of the ticketing terminal 30 situated notably on the upper face 38. Among these elements are represented:

the location 35 for contactless card reading,
the customer display 36,
the LEDs 37,
the antenna 41, and
the paper output 40.

The first rotation 400 is a rotation about a first axis 402. The first to axis 402 is for example perpendicular to the upper face 38 and centered with respect to the body 39 of the ticketing terminal 30. The first axis 402 is therefore for example almost vertical. The printer can notably perform a rotation about the first axis 402 so as to correctly place the paper output 40 of the printer with respect to a potential position of a customer. The first rotation 400 can be a partial rotation for example. The first rotation 400 can be left free during installation so as to correctly place the paper output 40. The first rotation 400 can thereafter be locked by way of one or more removable screws for example. It is not necessary for the paper output 40 to be able to rotate while the ticketing terminal 30 is being used.

The second rotation 401 is notably a rotation of an assembly of elements composed for example: of a contactless card reading location 35, of the customer display 36, of the LEDs 37. This assembly of elements forms notably part of a second customer interface. The second rotation 401 can be performed about a second axis 403 notably perpendicular to the upper face 38 and situated substantially at the center of the body 39 of the ticketing terminal 30. The second rotation axis 403 can be for example distinct from the first rotation axis 402. The second axis 403 is for example almost vertical. The second rotation 401 can make it possible in the course of the installation of the ticketing terminal 30 to correctly position the second customer interface with respect to a potential positioning of a customer in the vehicle. The second rotation 401 can also be locked by means of removable screws in the course of installation, after positioning the second customer interface as a function of the position of the ticketing terminal 30 in the vehicle.

The rotations 400, 401 allow best adjustment, during a phase of installing the ticketing terminal 30, of the angles of view and of the possible interactions between a driver and a customer or a passenger and the ticketing terminal 30.

FIGS. 5a, 5b, 5c represent a principle of positioning various elements of the ticketing terminal 30 as well as the positioning of the ticketing terminal 30.

The ticketing terminal 30 is positioned as a function notably of the position of a driver 50 of the transport vehicle. The ticketing terminal 30 is also positioned as a function of a positioning of a steering wheel 51 of the transport vehicle with respect to a stream of passengers 52 entering for example the vehicle, as well as with respect to a passenger 53 using the ticketing terminal 30.

In a general way, the driver 50 is situated facing the steering wheel 51. A first angle of view 54 of the driver interface 34 for viewing by the driver 50 is notably perpendicular to the driver interface 34.

In FIG. 5a, the ticketing terminal 30 is situated to the right of the steering wheel 51, the driver interface 34 facing the driver 50. The stream of passengers 52 in FIG. 5a comes from the right of the steering wheel 51, perpendicularly to an axis passing through the driver 50 and the steering wheel 51, and goes toward the rear of the vehicle, behind the driver 50. The passenger 53 is situated outside of the stream of passengers 52, facing the driver 50. A second angle of view 55 is the angle of viewing of the customer display 36 by the passenger 53. In a first disposition of the ticketing terminal 30 the second angle of view 55 is positioned at around one hundred and eighty degrees with respect to the first angle of view 54. In this case, the customer display 36 is parallel to the driver interface 34.

In FIG. 5b, the stream of passengers 52 originates from the right of the driver 50 and goes toward the rear of the vehicle, behind the driver 50. This occurs for example in a left-hand drive vehicle. The passenger 53 can then position himself to the right of the stream of passengers 52. The second angle of view 55 has a difference of ninety degrees, when rotating counterclockwise, with the first angle of view 54. The driver interface 34 is therefore in this case perpendicular to the customer display 36.

In FIG. 5c, the steering wheel 51 is positioned to the right of the stream of passengers 52. Such is for example the case for a right-hand drive vehicle. The stream of passengers 52 originates for example from the left of the driver 50 and goes toward the rear of the vehicle, behind the driver 50. In this case, the passenger 53 can position himself to the left of the steering wheel 51, outside of the stream of passengers 52. The second angle of view 55 is then positioned at two hundred and seventy degrees with respect to the first angle of view 54. The driver interface 34 is therefore perpendicular to the customer display 36.

The paper output 40 is generally positioned facing the passenger 53.

The ticketing terminal 30 therefore offers a great diversity of positionings of the driver interface 34 and of the second customer interface. This therefore makes it possible to adapt the ticketing terminal 30 to various public transport vehicles and to various types of driving.

By taking into consideration the stream of passengers 52 with respect to the passenger 53 using the ticketing terminal 30 and with respect to the driver 50 it is made possible to ease access to the transport vehicle for passenger boarding for example. Access thus eased is faster, the passengers entering being able for example to validate their transport ticket on a validator positioned a little further on in the vehicle.

Figure 6A:
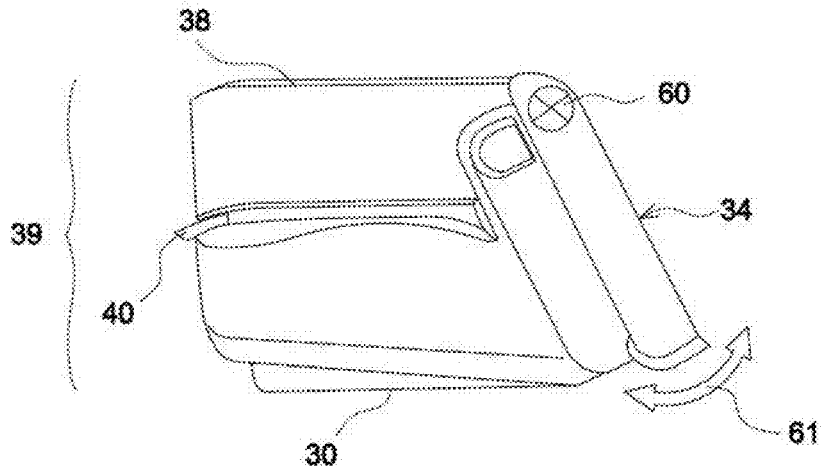
FIG. 6a: a first exemplary positioning of a driver screen of the terminal according to the invention.
Figure 6B:
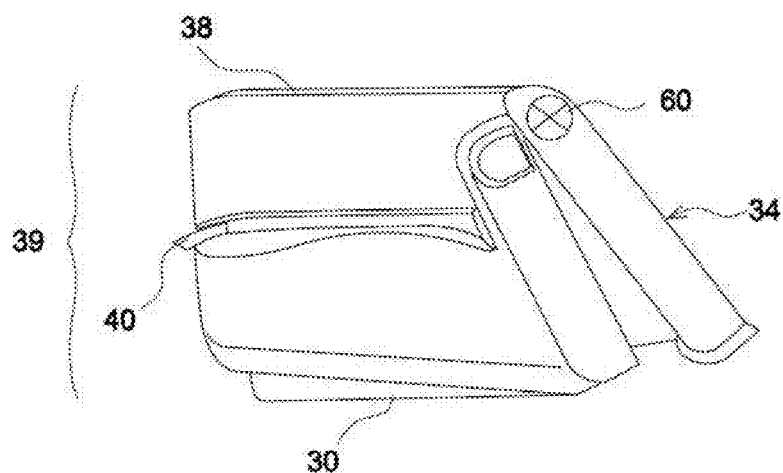
FIG. 6b: a second exemplary positioning of a driver screen of the terminal according to the invention.

FIGS. 6a and 6b represent examples of positioning of a driver interface 34 of the ticketing terminal 30 according to the invention. In FIGS. 6a and 6b, the ticketing terminal 30 is represented viewed in profile. In FIGS. 6a and 6b, are notably represented the body 39 of the ticketing terminal 30 viewed in profile, the upper face 38, the driver interface 34, the paper output 40.

The driver interface 34 can pivot in relation to a third rotation axis 60 situated on the upper part of the driver interface 34. The third rotation axis 60 is tied for example to the upper face 38. The driver interface 34 is therefore linked to the body 39 of the ticketing terminal 30 by way of the rotation axis 60. The driver interface 34 can pivot by about ten degrees for example. The driver interface 34 can thus perform a third rotation 61. Once the third rotation 61 of the driver interface 34 has been performed, the driver interface 34 remains in the desired position by virtue of locking means known elsewhere. The positioning of the driver interface 34 is not locked on installation, thereby allowing each driver 50 of the vehicle to position the driver interface 34 as he wishes. Thus one and the same driver's cab can be used by drivers of different sizes, in very varied brightness conditions. The ergonomics of the driver's cab is therefore improved by the possible rotation of the driver interface 34.

This principle of rotation of the driver interface 34 makes it possible to reduce the costs of studies of ergonomics of the driver's cab. This also makes it possible to reduce the toolkit required for installing the ticketing terminal 30 in order to position it correctly.

The various principles of rotation of the elements of the ticketing terminal 30 make it possible advantageously to reduce the costs of production and installation of such a piece of equipment. Likewise, installation is advantageously simpler by virtue of the rotation principles.

Moreover the ticketing terminal 30 can be adapted to various types of vehicles and to various types of driving while having good ergonomics of use both for the driver 50 and for the passengers 53.

The ticketing terminal 30 according to the invention advantageously exhibits a modularity: each sub-system, such as the printer, the contactless reader, the passenger display, the LEDs 37, the customer interface, being optional. The modularity of the ticketing terminal 30 eases its adaptation to various requirements of public transport operators.

Moreover the possibility of using the same central unit 21 in association with various types of terminal makes it possible to reduce the production costs but also the purchase costs for a customer wishing to upgrade his equipment with a new ticketing terminal 30.

The ticketing terminal 30 is also embodied in a very compact manner so as to have the smallest possible bulk, this advantageously eases the fitting thereof in the confined driver's cab of a public transport vehicle.

A single interface between the second central unit 21 and the ticketing terminal 30 can allow a reduction in the costs of wiring when installing the ticketing terminal 30 aboard a vehicle.

The invention claimed is:

1. An onboard ticketing terminal aboard a transport vehicle, the onboard ticketing terminal comprising a body equipped with at least:
   a contactless card reader;
   a swiveling customer interface;
   a printer rotatably disposed inside said body, paper output from the printer being performed through a slot made in the body; and
   a swiveling driver interface;
      wherein the driver interface comprises a swiveling screen, physically tied to the ticketing terminal.

2. The ticketing terminal as claimed in claim 1, wherein the orientation of the customer interface is performed by a first rotation of the customer interface about a first substantially vertical axis.

3. The ticketing terminal as claimed in claim 1, wherein the driver interface comprises a touch panel.

4. An onboard ticketing terminal aboard a transport vehicle, the onboard ticketing terminal comprising a body equipped with at least:
   a contactless card reader;
   a swiveling customer interface;
   a printer rotatably disposed inside said body, paper output from the printer being performed through a slot made in the body; and
   a swiveling driver interface;
      wherein the orientation of the customer interface is performed by a first rotation of the customer interface about a first substantially vertical axis, and the orientation of the paper output of the printer is achieved by a second rotation of the printer in relation to a second substantially vertical axis.

5. The ticketing terminal as claimed in claim 4, being linked by one or more interfaces to a central processing unit, remote from said ticketing terminal.

6. The ticketing terminal as claimed in claim 4, wherein a contactless card reading location and an antenna for detecting the presence of a contactless card on the reading location, which are linked to the contactless card reader, are situated on a substantially horizontal upper face of the ticketing terminal.

7. The ticketing terminal as claimed in claim 4, wherein the customer interface comprises a swiveling screen, situated on a substantially horizontal upper face of the ticketing terminal.

8. The ticketing terminal as claimed in claim 4, wherein the driver interface comprises a swiveling screen, physically tied to the ticketing terminal.

9. The ticketing terminal as claimed in claim 8, wherein the driver interface comprises a touch panel.

10. The ticketing terminal as claimed in claim 4, wherein the orientation of the driver interface is performed by a third rotation in relation to a third substantially horizontal axis.

11. The ticketing terminal as claimed in claim 10, wherein the driver interface pivots about the third axis passing through the upper part of the driver interface.

12. The ticketing terminal as claimed in claim 4, wherein the first rotation and the second rotation are locked.

13. The ticketing terminal as claimed in claim 12, wherein the locking of the first rotation and the locking of the second rotation are carried out by means of removable screws.

* * * * *